United States Patent Office 3,257,288
Patented June 21, 1966

3,257,288
FUEL ELEMENT CENTERING DEVICE FOR NUCLEAR REACTORS
Bernard Boudouresques, Paris, and Pierre Rouge, Gif-sur-Yvette, France, assignors to Commissariat à l'Energie Atomique, Paris, France
Filed Apr. 17, 1963, Ser. No. 273,623
Claims priority, application France, Apr. 20, 1962, 895,308
2 Claims. (Cl. 176—81)

The present invention relates to a fuel element centering device for nuclear reactors and especially for gas-cooled heterogeneous nuclear reactors.

It is already known to employ fuel elements of the type comprising a slug of fuel material (fissile or fertile) enclosed in a can, there being formed on the said can an even member of longitudinal series of fins which are inclined in relation to the longitudinal axis and which each occupy an angular sector of the can, the fins of each series being oppositely inclined with respect to the fins of the two adjacent series so as to provide a general arrangement in the form of ridges or herringbones. A fuel element of this type will accordingly be designated in the following description as a herringbone element.

It is also already known to dispose in each channel of a nuclear reactor a series, fuel elements, and to stack them one above the other so as to constitute a train of elements, and to circulate within each fuel channel a heat-carrying fluid for the purpose of removing the heat generated by the fuel.

In order that the flow induced by the herringbone elements should be established in an effective and uniform manner, it is necessary to maintain the fuel elements in central alignment along the axis of the fuel channel. However, the centering members which are employed for this purpose must be so designed that they do not interfere with the flow and produce only such pressure drops as are acceptable. Accordingly, the present invention is related to a herringbone fuel element which is simple, and which is provided with a centering device which neither disturbs the flow induced by the herringbone fin elements, nor has a neutron-absorption capacity which is undesirably high.

The invention will be more clearly understood from a perusal of the description which follows below and which relates to one form of embodiment of the invention which is given by way of nonlimitative example. Reference is made in the description to the accompanying drawings, in which.

Figure 2:
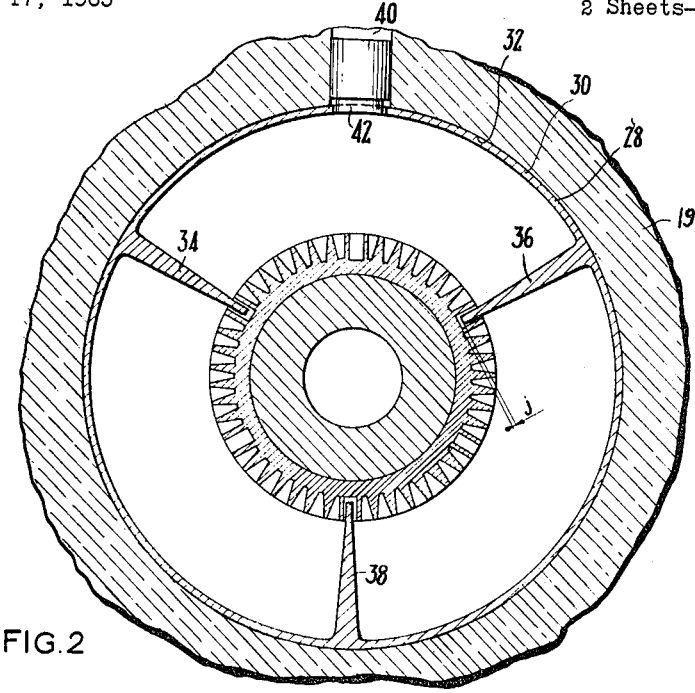
FIG. 2 is a view in transverse cross-section taken along the line 2—2 of FIG. 1.
Figure 3:
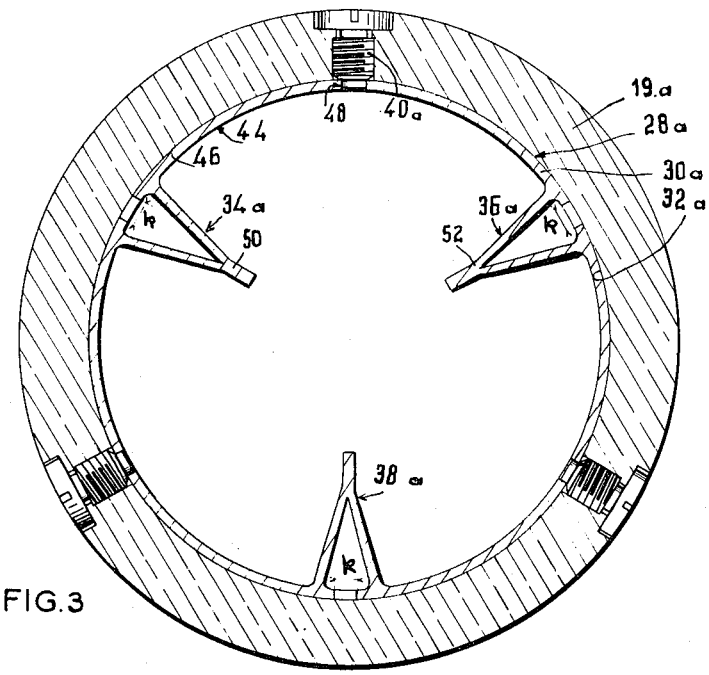

FIG. 3, which is similar to FIG. 2, shows an alternative form of the spider which is illustrated in FIG. 2.

The fuel element shown in the drawings is designed for a graphite-moderated reactor which is cooled by a circulation of $CO_2$ within vertical channels disposed within the moderator. However, the invention would of course also be applicable to fuel elements for liquid-moderator reactors provided with pressure tubes, fuel elements for reactors with horizontal channels, etc.

The fuel element comprises a tube 4 of fissile material which is formed of pure or low-alloy uranium. The said tube is closed at each end by a uranium cap 6. The tube is enclosed in a can 8 made of a material having low neutron absorption characteristics as well as satisfactory mechanical properties and fluid-tightness at high temperature, such as a magnesium-zirconium alloy having a low zirconium content. The inner face of the can is preferably provided with circular grooves such as the groove 10 which fit in corresponding grooves 12 of the tubular slug so as to prevent the relative sliding effect known as "ratchetting." The can is closed by welded plugs 14 and 16 of magnesium-manganese alloy having a very low manganese content in the case of cans which are constructed of magnesium-zirconium alloy.

The can 8 is provided on its outer surface with fins which are disposed at an oblique angle in relation to the longitudinal axis of the slug and which are grouped in six adjacent series each occupying an angular development which is slightly less than 60°. The fins of two adjacent series are oriented in relation to each other in such manner as to constitute a herringbone arrangement. Between two successive series, there is formed a longitudinal channel such as the channel 17, the function of which will be clearly brought out below. The number of series can be increased or reduced as a function of a certain number of parameters, especially as a function of the ratio of the diameter of the can to the diameter of the fuel channel 18 which is formed within the structure 19 and inside which the fuel element is centered by means of the device in accordance with the invention. The number of series is not less than four but can attain a maximum of twelve.

The retention of the fuel element in the longitudinal direction is ensured by means of any conventional device which has not been shown in the drawings.

The successive fuel elements can be disposed in abutment one against the other inside the fuel channel. Accordingly, the structure 19 is constituted by a sleeve of moderator material such as graphite, for example, the diameter of which is such as to permit said sleeve to be slidably inserted in a nuclear reactor channel; the weight of the fuel element is transmitted to the sleeve by means of a central member which is held in the sleeve by crossed wires having sufficient flexibility to absorb any shocks occurring during handling operations.

The sleeve having a cylindrical periphery can also be replaced by a block of moderator material having a prismatic periphery and provided with one or a number of channels, each designed to receive a fuel element of the type which has just been described, in accordance with any one of the arrangements described in U.S. patent application Serial No. 268,148, filed March 26, 1963 and now abandoned, and assigned to Commissariat a l'Energie Atomique.

The centering device in accordance with the invention comprises a number of spiders, namely three in number in the form of embodiment which has been illustrated. In all cases, one spider is disposed near each extremity of the fuel element and at least one other spider is placed in that zone in which said spider provides maximum effectiveness against buckling of the fuel element (vertical cartridge) or against sagging (horizontal cartridge). Only one intermediate spider is necessary under the following conditions which are given by way of example: fuel element consisting of a tube of uranium enclosed in a can having a diameter of 46 millimeters at the fin roots and a length of 564 millimeters, said element being disposed in a channel having a diameter of 104 millimeters. The problem of buckling or sagging of the fuel element is made worse by the high operating temperature which exceeds 350° C. in the reactors which are at present under construction or under design.

The spiders must not interfere with the coolant flow pattern which is established by the herringbone fin elements. The said flow pattern comprises a series of virtual streams flowing in spiral motion which are each limited by a series of fins and by a zone of the structure which has the same angular development; in each stream, a given gas streamline follows the profile of a fin, contacts a streamline produced by a fin which forms part of the adjacent series placed on one side, is caused to deviate radially up to the structure, returns along the inner wall of said structure, comes into contact with a streamline derived from that stream which flows on the other side of the series considered and finally returns along the said series.

Herringbone cans have the advantage of totally eliminating the aerodynamic forces which tend to cause the fuel element to rotate in the interior of the channel, since the gas streams induced in cans of this type are symmetrical in pairs. The spiders consequently do not have to apply an opposing couple and it is merely necessary to ensure that said spiders have sufficient rigidity both in the longitudinal and radial direction while requiring substantially lower strength in the circumferential direction.

To this end, each of the spiders 28, 28' and 28'' in accordance with the invention as shown in FIG. 2 comprises a ring 30 which is housed in an annular chamber 32 formed in the wall of the channel 18. In order that the spider can be assembled and held in position, the ring is split and has a diameter in the rest position which is larger than the diameter of the annular chamber. When the can is provided with six series of fins, each spider is preferably provided with three blades 34, 36 and 38 (as illustrated in FIG. 2) which fit inside one out of two of the grooves which are formed at an angular distance of 60° between two successive series of fins. The three blades are preferably engaged inside those grooves through which the gas streamlines circulating in a direction lengthwise of the can penetrate inside the unitary fin channels which are limited by two successive fins; the said zone is that in which the gas temperature is lowest and the mechanical strength of the materials located in that zone is thereby improved.

The longitudinal development of the blades 34, 36 and 38 is determined in such manner that the said blades withstand the radial strains produced at the time of incipient buckling. Moreover, if the cartridge were mounted horizontally, the said radial strains would in such a case exist permanently, the element then bearing on the spiders.

The spiders are secured against translational motion as a result of the abutment thereof against the shoulders which delimit the annular chambers. The said spiders are secured against rotation by suitable means such as a dowel-pin 40 fitted in a radial bore which is formed in the structure 19; the dowel-pin terminates in an extension 42 which is engaged inside a recess of corresponding shape constituted by cut-out portions in the ends formed by the slit in the split ring 30.

A radial clearance $j$ must be provided at room temperature between each blade tip and the bottom of each groove (as shown in FIG. 2) so as to permit the free expansion of parts and especially the "swelling" of the fuel element and the radial expansion of the blades which are generally formed of the same magnesium alloy as the can.

The blades must have a profile such as to provide the necessary rigidity with a maximum cross-section which is as small as possible in the direction of flow. The blades should preferably be wedge-shaped as shown in FIG. 2, since the stresses are greatest at the blade roots. The longitudinal development of the blades is governed to a greater extent by the buckling of the fuel element when the creep temperature is approached than by the strength of the spiders, the work of these latter being facilitated by the absence of any aerodynamic force which tends to cause the rotation of the fuel element.

Figure 1:
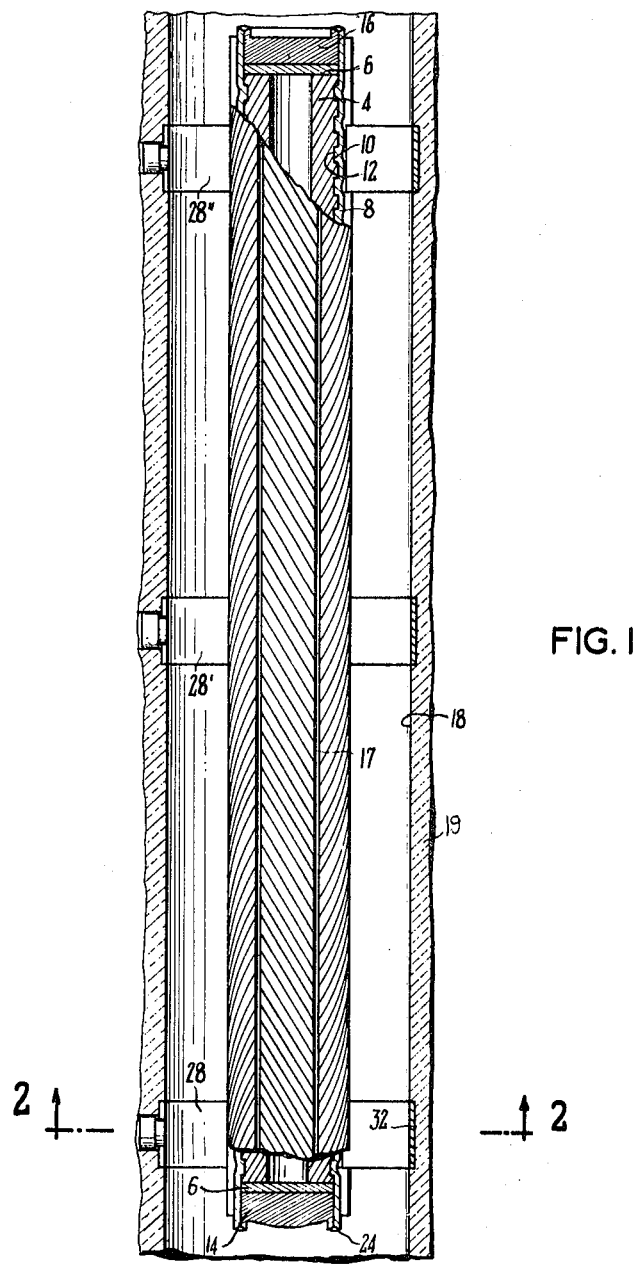
FIG. 1 is a view in elevation and in partial longitudinal cross-section of a fuel element which constitutes a preferred form of embodiment of the invention.

In the form of embodiment which is shown in FIG. 1, the central spider is disposed at equal distance from the two other spiders. In certain cases, it can prove an advantage to place the central spider nearer to either one end or the other.

FIG. 3 shows an alternative form of the spider of FIG. 2, the said alternative form being also designed for use in the arrangement of FIG. 1. For the sake of greater clarity of the drawings, the elements of FIG. 3 which correspond to those which have been shown in FIG. 2 have been designated by the same reference numerals, to which has been assigned the index $a$.

The spider 28$a$ is constituted by a ring 30$a$ fitted inside an annular chamber 32$a$ which is formed in the structure 19$a$ as constituted by a sleeve and provided with three "blades" 34$a$, 36$a$ and 38$a$. The axial length of the annular chamber is slightly greater than that of the spider in order to provide a slight allowance in assembly.

The spider 28$a$ differs from the spider 28 in that it is constituted by three identical elements which are rigidly coupled to each other at the level of the blades. The element 44, for example, is made up of a sector 46 which is pierced with a central hole 48 and two half-blades 50 and 52 which converge towards a line located beyond the axis of the channel. The half-blades of two adjacent sectors are joined together at their extremities, for example by welding, and allow a clearance $k$ to remain between two consecutive sectors. The said clearance provides the spider with a sufficient degree of elasticity to permit this latter to be inserted in the channel at the level of the annular chamber by drawing the blades together.

Rotational motion of the spider is prevented by means of three screws such as the screw 40$a$ which are each engaged inside one of the holes such as the hole 48 so as to immobilize the corresponding sector. The said three screws are engaged inside threaded radial holes formed in the sleeve.

It will be understood that the types of spider which have been illustrated are not limitative. It would be possible, for example, to make use of three independent blades embedded directly in the structure 19.

What we claim is:

1. In a gas cooled nuclear reactor having a moderator structure and a bore in the moderator structure, a slug of fuel material in the bore, a can enclosing said slug, an even number of longitudinal series of fins on said can, each of said series of fins occupying an angular sector of the surface of said can, the fins of a series of said fins being oppositely inclined with respect to the fins of adjacent ones of said series of fins forming a herringbone pattern, the coolant gas circulating in said bore over said series of fins, longitudinal grooves separating adjacent ones of said series of fins, counter-bores in the bore, a spider mounted in each of said counter-bores and secured against rotational and translational movement therein, at least three of said spiders being spaced along said can, each of said spiders comprising an expansible split ring locked in the adjacent one of said counter-bores, a plurality of spaced longitudinal blades on said ring, each of said blades extending radially into the adjacent one of said grooves, one of said spiders being adjacent each end of said can and support means in the bore supporting said can.

2. A reactor as described in claim 1, each of said spiders comprising a plurality of identical elements forming said ring, each of said elements comprising a cylindrical sector, each of said blades comprising two half-blades, one of said half-blades being mounted adjacent an end of each of said sectors and two adjacent half-blades being joined at their internal extremities at an angle such that a clearance is provided between adjacent ones of said sectors.

References Cited by the Examiner

UNITED STATES PATENTS

| | | | |
|---|---|---|---|
| 2,985,575 | 5/1961 | Dennis et al. | 176—77 |
| 3,030,292 | 4/1962 | Ritz | 176—81 |
| 3,030,293 | 4/1962 | Wyatt | 176—81 |
| 3,100,743 | 8/1963 | Aubert et al. | 176—77 |
| 3,116,213 | 12/1963 | Ritz | 176—77 |
| 3,128,235 | 4/1964 | Hackney et al. | 176—77 |

FOREIGN PATENTS

| | | |
|---|---|---|
| 229,988 | 8/1960 | Australia. |
| 237,547 | 2/1962 | Australia. |
| 656,914 | 1/1963 | Canada. |
| 784,890 | 10/1957 | Great Britain. |
| 821,263 | 10/1959 | Great Britain. |

OTHER REFERENCES

Directory of Nuclear Reactors, vol. IV, page 222, July 1962.

LEON D. ROSDOL, *Primary Examiner.*

CARL D. QUARFORTH, *Examiner.*

R. C. LYNE, M. J. SCOLNICK, *Assistant Examiners.*